(12) United States Patent
Suzuki et al.

(10) Patent No.: US 8,441,970 B1
(45) Date of Patent: *May 14, 2013

(54) UPLINK RESYNCHRONIZATION FOR USE IN COMMUNICATION SYSTEM

(71) Applicant: Research In Motion Limited, Waterloo (CA)

(72) Inventors: Takashi Suzuki, Ichikawa (JP); Zhijun Cai, Euless, TX (US); Richard C. Burbidge, Hook (GB)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/743,557

(22) Filed: Jan. 17, 2013

Related U.S. Application Data

(63) Continuation of application No. 12/569,340, filed on Sep. 29, 2009.

(60) Provisional application No. 61/100,778, filed on Sep. 29, 2008.

(51) Int. Cl.
*H04B 7/00* (2006.01)

(52) U.S. Cl.
USPC .......................................... 370/310

(58) Field of Classification Search .......... 370/310, 370/328, 329, 342–350, 431, 437, 464, 465; 455/403, 455/422, 450–452
See application file for complete search history.

(56) References Cited

U.S. PATENT DOCUMENTS

| | | | |
|---|---|---|---|
| 7,933,243 | B2 | 4/2011 | Yi et al. |
| 7,957,298 | B2 | 6/2011 | Yi et al. |
| 2008/0310396 | A1 | 12/2008 | Park et al. |
| 2008/0311919 | A1* | 12/2008 | Whinnett et al. ............. 455/447 |
| 2009/0204862 | A1 | 8/2009 | Chun et al. |
| 2009/0279495 | A1* | 11/2009 | Yoo .............................. 370/329 |
| 2009/0300457 | A1* | 12/2009 | Kuo ............................ 714/749 |
| 2009/0316637 | A1 | 12/2009 | Yi et al. |

(Continued)

FOREIGN PATENT DOCUMENTS

| | | |
|---|---|---|
| EP | 2 086 258 | 2/2009 |
| EP | 2 161 960 | 7/2009 |

(Continued)

OTHER PUBLICATIONS

"3GPP TS 36.321 V8.2.0—Evolved Universal Terresterial Radio Access (E-UTRA) Medium Access Control (MAC) protocol specification (Release 8)," 3rd Generation Partnership Project—Technical Specification Group Radio Access Network, May 1, 2008, pp. 1-33 (33 pages).

(Continued)

*Primary Examiner* — Thai Nguyen
(74) *Attorney, Agent, or Firm* — Finnegan, Henderson, Farabow, Garrett & Dunner, LLP

(57) ABSTRACT

A method and apparatus for reusing an uplink control channel configuration associated with an uplink control channel, the method comprising the steps of, at a user agent, receiving an uplink control channel resource configuration assigned by an access device, transmitting to the access device using the control channel resources associated with the received uplink control channel resource configuration and, after a time alignment timer expires, retaining the uplink control channel resource configuration.

19 Claims, 11 Drawing Sheets

U.S. PATENT DOCUMENTS

| | | | |
|---|---|---|---|
| 2010/0061361 | A1 | 3/2010 | Wu |
| 2010/0074201 | A1 | 3/2010 | Wu |
| 2010/0074202 | A1 | 3/2010 | Park et al. |
| 2010/0080155 | A1 | 4/2010 | Suzuki et al. |
| 2010/0202380 | A1 | 8/2010 | Park et al. |
| 2010/0296454 | A1 | 11/2010 | Park et al. |
| 2010/1284376 | | 11/2010 | Park et al. |

FOREIGN PATENT DOCUMENTS

| | | |
|---|---|---|
| EP | 2 101 538 | 9/2009 |
| EP | 2 166 802 | 3/2010 |
| WO | 2009/147709 | 12/2009 |

OTHER PUBLICATIONS

Change Request; 3GPP TSG-RAN2 Meeting #64bis; R2-090686; Ljubljana, Slovenia, Jan. 12-16, 2009 (4 pages).

Change Request; 3GPP TSG-RAN2 Meeting #64bis; R2-090687; Ljubljana, Solevenia, Jan. 12-16, 2009 (3 pages).

Change Request; 3GPP TSG-RAN2 Meeting #65bis; R2-092705; Seoul, South Korea, Mar. 23-27, 2009 (4 pages).

Change Request; 3GPP TSG-RAN2 Meeting: Prague, Czech Republic; Oct. 10-14, 2008; (2 pages).

Fujitsu, "TAT expiry during RA procedure," 3 GPP TSG RAN WG2 Meeting #63; R2-084479; XP050319530, Jeju, Korea, Aug. 18, 2008 (4 pages).

Handling of expired TAT and failed D-SR; Huawe; Discussion and Decision; 3GPP TSG-RAN2 Meeting #65bis; R2-092145; Mar. 23-27, Seoul, South Korea (2 pages).

Handling of expired TAT and failed D-SR; Huawei; Discussion and Decision; 3GPP TSG-RAN2 Meeting #65bis R2-092145; Mar. 23-27, Seoul, South Korea (2 pages).

International Preliminary Report on Patentability and Written Opinion for Int'l. Appln. No. PCT/US2009/058707, mailed Apr. 18, 2011 (9 pages).

International Search Report and Written Opinion in International Application No. PCT/US2009/058707, mailed Feb. 12, 2010 (14 pages).

Japanese Notice of Reasons for Rejection dated Aug. 28, 2012, for Japanese Application No. 2011-529344 (5 pages).

Korean Office Action dated Aug. 28, 2012, issued in Korean Application No. 10-2011-7009529 (7 pages).

Mexican Office Action dated Jul. 17, 2012, issued in Mexican Application No. MX/a/2011/003203 (2 pages).

Notice of Allowance mailed Apr. 17, 2012, issued in U.S. Appl. No. 13/244,725 (9 pages).

PCT Search Report and Written Opinion for International Application No. PCT/US2010/039176, mailed May 16, 2011 (10 pages).

SRS and CQI Resources Release upon TAT Expiry; Nokia Corporation, Nokia Siemens Networks Discussion and Decision; 3GPP TSG-RAN WG2 Meeting; Prague, Czech Republic; Nov. 10-14, 2008 (2 pages).

SRS and CQI Resources Release; Nokia Corporation, Nokia Siemens Networks; Networks Discussion and Decision; 3GPP TSG-RAN WG2 Meeting; Prague, Czech Republic; Nov. 10-14, 2008 (1 page).

U.S. Office Action mailed Feb. 24, 2012, issued in U.S. Appl. No. 13/244,725 (5 pages).

U.S. Office Action mailed Nov. 10, 2011, issued in U.S. Appl. No. 13/244,725 (5 pages).

* cited by examiner

UPLINK RESYNCHRONIZATION FOR USE IN COMMUNICATION SYSTEM

BACKGROUND

The present invention relates generally to data transmission in mobile communication systems and more specifically to methods for re-synchronizing an uplink between a user agent and an access device.

As used herein, the terms "user agent" and "UA" can refer to wireless devices such as mobile telephones, personal digital assistants, handheld or laptop computers, and similar devices that have telecommunications capabilities. In some embodiments, a UA may refer to a mobile, wireless device. The term "UA" may also refer to devices that have similar capabilities but that are not transportable, such as desktop computers, set-top boxes, or network nodes.

In traditional wireless telecommunications systems, transmission equipment in a base station or access device transmits signals throughout a geographical region known as a cell. As technology has evolved, more advanced equipment has been introduced that can provide services that were not possible previously. This advanced equipment might include, for example, an E-UTRAN (evolved universal terrestrial radio access network) node B (eNB), a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). As used herein, the term "access device" will refer to any component, such as a traditional base station or an LTE eNB (Evolved Node B), that can provide a UA with access to other components in a telecommunications system.

In mobile communication systems such as the E-UTRAN, the access device provides radio accesses to one or more UAs. The access device comprises a packet scheduler for allocating uplink and downlink data transmission resources among all the UAs communicating to the access device. The functions of the scheduler include, among others, dividing the available air interface capacity between the UAs, deciding the resources (e.g. sub-carrier frequencies and timing) to be used for each UA's packet data transmission, and monitoring packet allocation and system load. The scheduler allocates physical layer resources for downlink shared channel (PDSCH) and uplink shared channel (PUSCH) data transmissions, and sends scheduling information to the UAs through a scheduling channel. The UAs refer to the scheduling information for the timing, frequency, data block size, modulation and coding of uplink and downlink transmissions.

There are several ways to start an unscheduled communication between an access device and a UA which has already established a connection to the access device. Here two ways to start a communication are described including a first way initiated by a UA and a second way initiated by an access device. One of skill in the art should recognize that after UA to access device connection is initially established the access device will have allocated a unique Cell Radio Network Terminal Identity (C-RNTI) to the UA. With respect to the UA initiated communication, the UA has to first request to access the access device within a cell associated with the access device. To request an access, a UA initiates a random access (RA) process whereby the UA selects one of a plurality of predetermined code sequences called RA preambles randomly or via a predetermined rule and transmits the selected RA preamble on an asynchronous RA CHannel (RACH).

When the access device receives the RA preamble, the access device transmits an RA response message including an RA preamble identifier (id or index) for the RA preamble, a timing advance value by which to adjust UpLink (UL) timing synchronization, grant information indicating UL resources allocated for transmitting subsequent messages, and a Temporary Cell Radio Network Terminal ID (Temporary C-RNTI) that is used as a temporary UA ID during the random access procedure. After receiving the RA response message, the UA checks the RA preamble id and if the checked RA preamble id is identical to that of the transmitted RA preamble, the UA transmits an uplink scheduling transmission to the access device. One exemplary type of uplink scheduling transmission includes a buffer status report (BSR) including the assigned C-RNTI in order to report amount of data in the UA's uplink buffer to be sent to the access device.

If a plurality of UAs transmit the same preamble to the access device at the same time, contention occurs in the RA procedure. When contention occurs, the access device resolves the contention and transmits a Contention Resolution (CR) message on the PDCCH to the C-RNTI of the UA that won the contention. Each UA having a C-RNTI can determine from the C-RNTI of the CR message whether it has won or lost the RA contention. If the C-RNTI of the CR message is not that of a UA, the UA has lost the contention and the UA re-starts the RA procedure. If the C-RNTI of the CR message matches the C-RNTI of a UA, the UA has won the contention and successfully completed the random access procedure.

With respect to the access device initiated communication, an access device can start an unscheduled communication by transmitting a downlink data arrival notification with a dedicated preamble on the PDCCH to the C-RNTI associated with a UA. When the UA associated with the C-RNTI receives a downlink data arrival notification, the UA recognizes that the access device has data to transmit to the UA and starts a random access process by generating and transmitting the dedicated preamble transmission (i.e., a preamble specifically assigned to the C-RNTI by the access device) back to the access device. The access device transmits an RA response when the dedicated preamble is received where the RA response includes, among other data, a timing advance value by which to adjust UpLink (UL) timing synchronization.

UAs are only allowed to transmit data at their allocated time intervals. If there is data to be transmitted, a UA temporarily stores the data in a UA data buffer and transmits the data using granted uplink allocations. From time to time, the UA reports to the access device an amount of data stored in the buffer in a BSR and requests an allocation of resource for transmitting the data. The access device allocates an uplink grant to the UA based at least in part on the amount of data reported by the BSR and communicates that grant to the UA. After the grant is received, the UA transmits data on the uplink shared channel in a manner consistent with the allocated grant.

In order to facilitate non contentious access request for a UA which maintains uplink time alignment or synchronization, the access device may periodically allot an uplink resource to the UA during which the UA may transmit a scheduling request (SR) to the access device for requesting an uplink grant for transmitting the BSR or other uplink scheduling transmission to the access device when there is data in the UA's uplink data buffer. The SR uses on-off keying on the physical uplink control channel PUCCH. The access device is programmed to monitor for the SR during the uplink period and when no SR is received during the period, to recognize that the UA has no uplink data in the UA's buffer for transmission and the access device foregoes granting an uplink period for BSR delivery.

When an SR signal is detected during the allotted period, the access device assumes that the UA requires more uplink resources and grants an uplink resource for BSR delivery. After the uplink resource for BSR delivery is received at the UA, the UA transmits the BSR to the access device using the allocated resources. After the BSR is delivered, the access device identifies further uplink resources required to deliver the buffered data and may grant an additional uplink resource for transmission of the buffered data.

In the latest versions of E-UTRAN, an enhanced uplink channel is provided for supporting the scheduling mechanism and a hybrid automatic repeat request (HARQ) scheme. An example of HARQ is specified in 3GPP TS36.321. The HARQ scheme is used both in uplink and downlink in E-UTRAN. Take downlink transmission for example, for each protocol data unit (PDU) received, a positive acknowledgment (ACK) is transmitted on a Physical Uplink Control Channel (PUCCH) or a PUSCH from the UA to the access device after a cyclic redundancy check (CRC) performed by the UA indicates a successful decoding. If the CRC indicates a PDU is not received correctly, the UA transmits a negative acknowledgement (NACK) on the PUCCH or PUSCH in order to request a retransmission of the erroneously received PDU.

In the case of uplink transmissions the HARQ scheme is a bit more complicated and involves, in addition to positive and negative acknowledgements on a Physical HARQ Indicator Channel (PHICH), new transmission grants, retransmission grants, or no data on the PDCCH where UA behavior depends upon the data received via both the PDCCH and the PHICH channels.

In order to facilitate uplink transmission from a UA to an access device, an access device and a UA need to adjust the transmission timing so that the transmission reaches the access device at a certain time with an allowed margin for error regardless of the distance between the UA and the access point. To this end, the access device sends a Time Alignment (TA) command including a time advance value as a MAC Control Element when transmission timing adjustment is needed or periodically (see Sections 5.2 and 6.1.3.5 of 3GPP TS36.321) and the UA operates a Time Alignment (TA) timer. When a TA command is received, the UA applies the received TA value to restart the TA timer. If the TA timer expires, the UA recognizes that uplink time alignment or uplink synchronization is lost and releases control channel resources (e.g. PUCCH or SRS resources). Uplink synchronization means that the UA maintains uplink time alignment.

Whenever data needs to be transmitted from a UA to an access device or vice versa, allocating resources quickly so that transmission can occur is extremely important and the industry is always searching for ways to eliminate unneeded steps in the allocation process. One circumstance that requires several process steps to resolve is where uplink synchronization is lost when the TA timer expires so that control channel resources are released and a new random access process must be performed.

Uplink synchronization can be lost either purposefully or via error. With respect to purposeful loss, an access device is programmed to facilitate optimal use of communication channels. One way to optimally use a channel is to cause a UA to release allocated resources (e.g. PUCCH and SRS resources) when the UA is not generating enough traffic to justify the resource allocation. To cause a UA to release resources, an access device may stop sending TA commands to the UA thereby causing the UA to release the uplink control resources configured for the UA without any explicit signaling to the UA.

With respect to loss of uplink synchronization via error, on a noisy channel, a TA command may not reach a UA but an access device may erroneously sense an ACK confirming delivery. Here, if the UA's TA timer expires prior to reception of a next TA command, the UA can loose uplink synchronization and release the control channel resources.

Subsequent to a UA releasing resources, the UA may need to transmit data to the access device. For instance, where synchronization is lost due to a NACK-ACK error at the access device while data resides in the UA's uplink buffer, the UA will need to immediately transmit data to the access device. As another instance, when the UA receives new uplink data the UA will need to transmit the data to the access device. Similarly, subsequent to the UA releasing resources, the access device may need to transmit data to the UA. Here, the access device transmits a new downlink data arrival notification to the UA and the UA responds by starting a random access procedure as described above.

Where an access device purposefully allows a TA timer to expire so that uplink synchronization is lost and a UA subsequently receives new uplink data for transmission to the access device or an access device subsequently receives new downlink data to be transmitted to the UA, as specified in 3GPP TS36.331, after a random access procedure is completed, an access device sends an RRC Connection Reconfiguration message to the UA and the UA replies with an RRC Connection Reconfiguration Complete message to reassign resources before data transfer starts.

Thus, it would be advantageous to have a system wherein the number of process steps to re-establish uplink synchronization after uplink synchronization is lost and the amount of data transmission needed to re-establish synchronization can be reduced.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
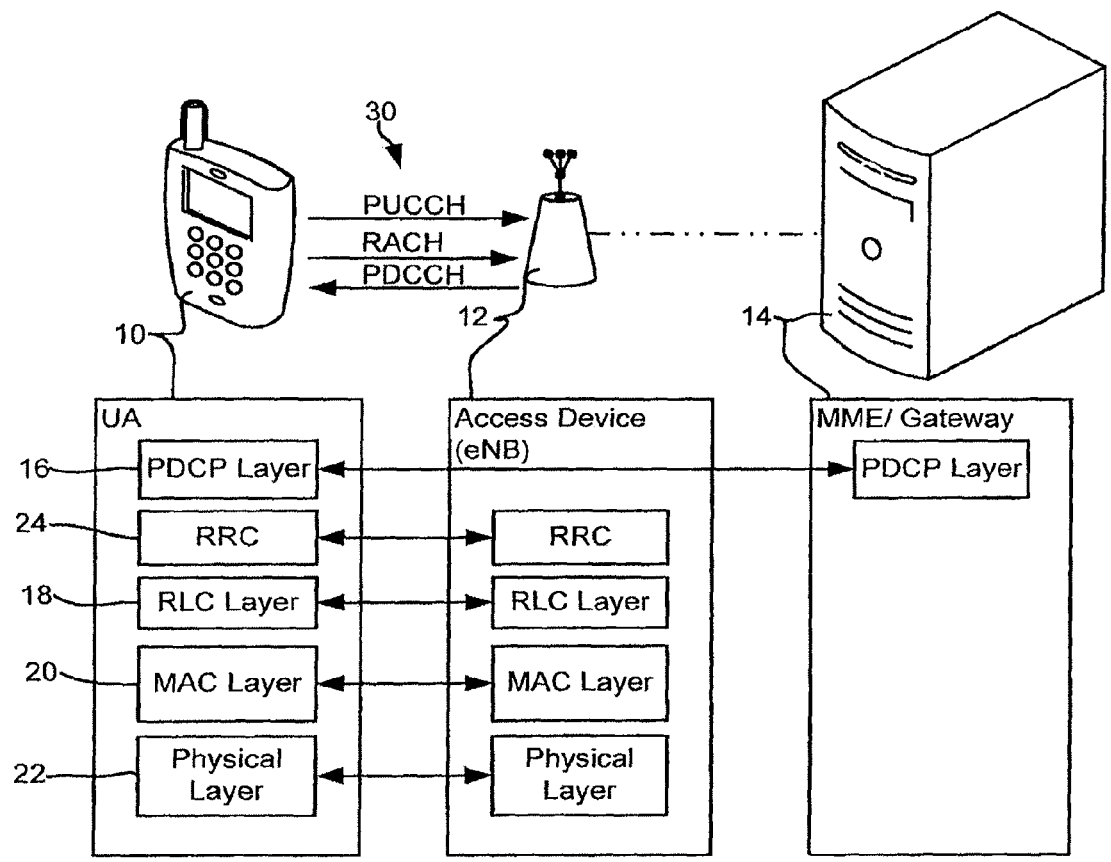
FIG. 1 is a diagram of a wireless communications system including a user agent (UA), an access device and a Mobility Management Entity (MME)

It has been recognized that after a TA timer period expires and a UA releases control channel resources, the released resources may still be available and valid for use by the UA when UA-access device communication has to next be established. Here, where released resources are still available several steps required by current standards to re-synchronize the uplink may be eliminated. More specifically, where released resources are still valid and synchronization was lost because the access device stopped transmitting TA commands, an access device can indicate that the resources are valid in a contention resolution message (e.g., in the uplink grant on the PDCCH during the random access procedure) or downlink data arrival indication so that the two RRC messages can be avoided. In the alternative, where an access device transmits a new downlink data arrival notification to a UA, the notification may include an indication that the resources are still valid so that the two RRC messages can be avoided. Moreover, where an access device transmits a new downlink data arrival notification to a UA and the UA starts a random access procedure, the RA response from the access device may include the indication that the resources are still valid.

To the accomplishment of the foregoing and related ends, the disclosure, then, comprises the features hereinafter fully described. The following description and the annexed drawings set forth in detail certain illustrative aspects of the invention. However, these aspects are indicative of but a few of the various ways in which the principles of the disclosure can be employed. Other aspects, advantages and novel features of the disclosure will become apparent from the following detailed description of the disclosure when considered in conjunction with the drawings.

The various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

At least some embodiments described herein include a method for reusing an uplink control channel configuration associated with an uplink control channel, the method comprising the steps of, at a user agent, receiving an uplink control channel resource configuration assigned by an access device, transmitting to the access device using the control channel resources associated with the received uplink control channel resource configuration and, after a time alignment timer expires, retaining the uplink control channel resource configuration.

In at least some cases the method further includes the steps of reestablishing time alignment with the access device and reusing the control channel resources associated with the uplink control channel resource configuration to transmit to the access device. In some embodiments the step of reestablishing time alignment with the access device includes reestablishing alignment with the access device through a random access procedure.

In some embodiments the step of retaining the uplink control channel resource configuration includes storing the uplink control channel resource configuration. In at least some cases the method further includes the steps of, after the time alignment timer expires, determining that the retained uplink control channel resource configuration is still valid. In at least some cases the method further includes the steps of, after determining that the retained uplink control channel resource configuration is still valid, reusing the control channel resources associated with the retained uplink control channel resource configuration to transmit to the access device. In at least some cases the method further includes the step of, after the time alignment timer expires, reusing the control channel resources associated with the retained uplink control channel resource configuration to transmit to the access device.

Some embodiments include a method for reusing an uplink control channel configuration associated with an uplink control channel, the method comprising the steps of, at a user agent, maintaining a time alignment timer, receiving an uplink control channel resource configuration assigned by an access device, transmitting to the access device using the control channel resources associated with the received uplink control channel resource configuration and after the time alignment timer expires: (i) storing the uplink control channel resource configuration, (ii) reestablishing alignment with the access device through a random access procedure and (iii) reusing the control channel resources associated with the uplink control channel resource configuration to transmit to the access device.

Some embodiments include a user agent apparatus comprising a processor, a transmitter linked to the processor and a receiver linked to the processor, wherein the processor is programmed to perform the steps of receiving an uplink control channel resource configuration assigned by an access device, transmitting via the transmitter to the access device using the control channel resources associated with the received uplink control channel resource configuration and after a time alignment timer expires, retaining the uplink control channel resource configuration.

In some cases the processor is further programmed to perform the steps of reestablishing time alignment with the access device and reusing the control channel resources associated with the uplink control channel resource configuration to transmit to the access device.

In some cases the processor performs the step of reestablishing alignment with the access device by reestablishing alignment with the access device through a random access procedure.

Some embodiments further include a memory linked to the processor wherein the processor performs the step of retaining the uplink control channel resource configuration by storing the uplink control channel resource configuration in the memory.

In some cases the processor is further programmed to perform the steps of, after the time alignment timer expires, determining that the retained uplink control channel resource configuration is still valid.

In some cases the processor is further programmed to perform the steps of, after determining that the retained uplink control channel resource configuration is still valid, reusing the control channel resources associated with the retained uplink control channel resource configuration to transmit to the access device.

In some cases the processor is further programmed to perform the steps of, after the time alignment timer expires, reusing the control channel resources associated with the retained uplink control channel resource configuration to transmit to the access device.

Other embodiments include a user agent apparatus comprising a processor, a transmitter linked to the processor and a receiver linked to the processor, wherein the processor is programmed to perform the steps of maintaining a time alignment timer, receiving via the receiver an uplink control channel resource configuration assigned by an access device, transmitting via the transmitter to the access device using the control channel resources associated with the received uplink control channel resource configuration and, after the time alignment timer expires, (i) storing the uplink control channel resource configuration, (ii) reestablishing alignment with the access device through a random access procedure and (iii) reusing the control channel resources associated with the uplink control channel resource configuration to transmit via the transmitter to the access device.

Referring now to the drawings wherein like reference numerals correspond to similar elements throughout the several views and more specifically, referring to FIG. 1, FIG. 1 includes a block diagram illustrating a long-term evolution (LTE) control plane protocol stack.

A UA 10 communicates with both an access device (i.e., an evolved Node B) 12 and a mobility management entity (MME) 14. Various layers are illustrated in the control plane protocol stack. A non-access stratum (NAS) layer (not shown) may handle mobility and session management. A packet data convergence protocol (PDCP) layer 16 is illustrated both on the UA 10 and on the access device 12. The PDCP layer 16 performs internet protocol (IP) header compression and decompression, encryption of user and signaling data, transfer of user data and maintenance of sequence numbers (SN) for radio bearers.

Below the PDCP layer 16 is a radio link control (RLC) protocol layer 18 which communicates with the radio link control protocol layer on the access device 12. As will be appreciated, communication occurs through the physical layer in protocol stacks such as those illustrated in FIG. 1. However, RLC-protocol data units (PDUs) from the RLC layer 18 of the UA are interpreted by the RLC layer on the access device 12. Below RLC layer 18 is a medium access control (MAC) data communication protocol layer 20. As will be appreciated by those skilled in the art, the RLC and MAC protocols form the data link sub-layers of the LTE radio interface and reside on the access device 12 and on the UA 10 in LTE. Layer 1 (L1) LTE which is referred to as the physical layer 22 is below the RLC/MAC layers 18 and 20 and, as the label implies, is the physical layer for communications.

Referring still to FIG. 1, the control plane includes a radio resource control (RRC) protocol layer 24 that is the part of the protocol stack that is responsible for the assignment, configuration and release of radio resources between the UA 10 and the access device 12. Basic functionalities of RRC protocol for LTE are described in 3GPP TR36.300 and TS36.331.

Access device 12 hosts the following functions: radio resource management: radio bearer control, radio admission control, connection mobility control, dynamic allocation of resources to UAs in both uplink and downlink (scheduling); IP header compression and encryption of user data stream; selection of an MME at UA attachment; routing of user plane data towards serving gateway; scheduling and transmission of paging messages (originated from the MME); scheduling and transmission of broadcast information; and measurement and measurement reporting configuration for mobility and scheduling.

MME 14 hosts the following functions: distribution of paging messages to the access devices 12; security control; idle state mobility control; System Architecture Evolution (SAE) bearer control; ciphering and integrity protection of Non-Access Stratum (NAS) signaling.

Figure 2:
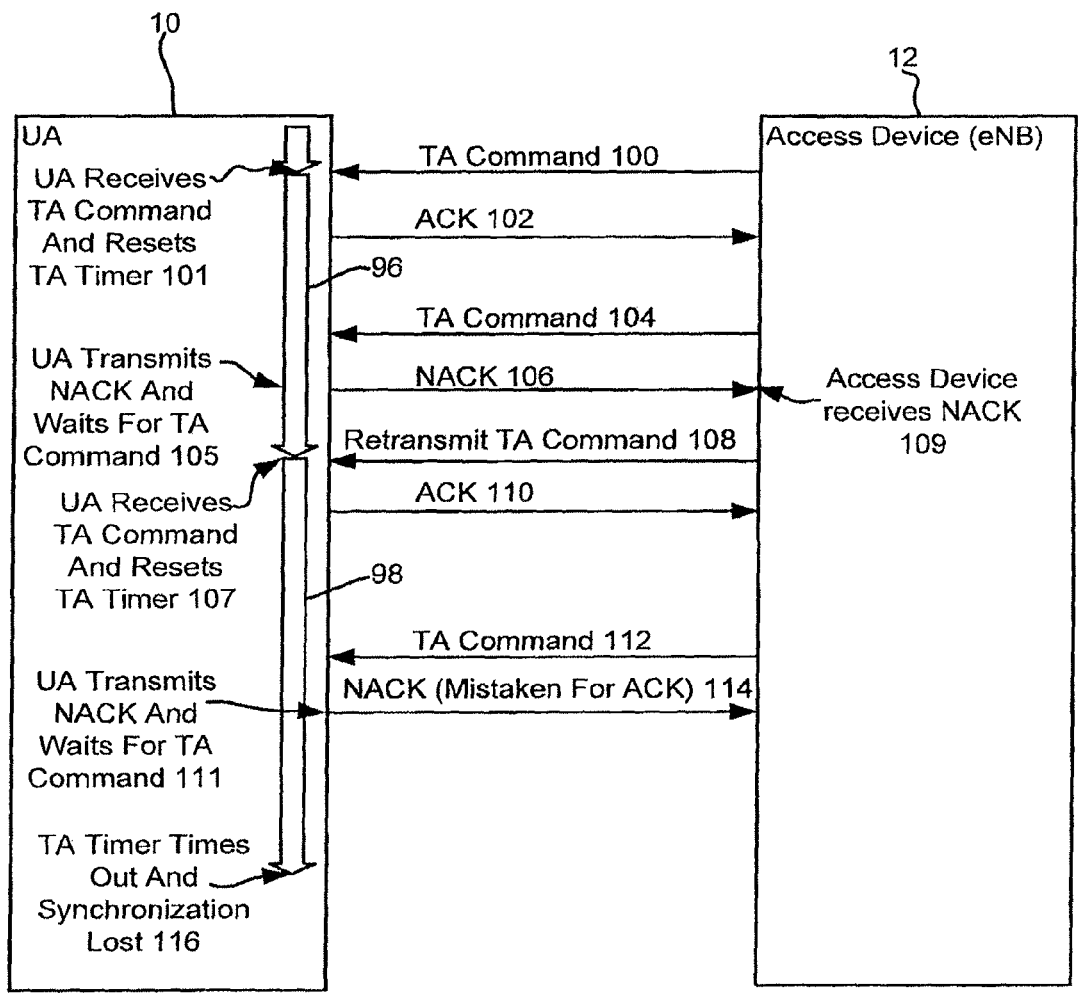
FIG. 2 is a schematic illustrating a communication sequence between a UA and an access device.

Referring still to FIG. 1, in at least some embodiments of the disclosure, UA 10 can advantageously take affirmative steps to resynchronize uplink communication with access device 12 after synchronization has been lost. To this end, referring to FIG. 2, an exemplary series of communications between UA 10 and access device 12 are illustrated. In FIG. 2 the downwardly pointing arrows 96 and 98 represent TA timer periods. At 100 a TA command is transmitted from access device 12 to UA 10. When command 100 is received at 101, UA 10 applies the TA value in the TA command and restarts the TA timer (see 96) and at 102 transmits an ACK to access device 12.

Referring still to FIG. 2, at 104 another TA command is transmitted to UA 10. This time, however, the TA command is not correctly received and therefore the TA data cannot be used to reset the TA timer and the timer continues to time out. Because the TA command was not received properly, UA 10 transmits a NACK back to access device 12 at 105 indicating that the PDU should be retransmitted. At 109, access device 12 receives the NACK and at 108 the TA command is retransmitted back to UA 10. At 107 the TA command is received, UA 10 applies the TA value in the TA command and restarts the TA timer (see 98) and an ACK is transmitted back to access device 10 to indicate that the retransmission was correctly received.

Referring once again to FIG. 2, at 112 another TA command is transmitted to UA 10 which is again incorrectly received. At 111, UA 10 transmits a NACK (114) to access device 12 to request retransmission of the TA command. This time, however, access device 12 erroneously detects an ACK instead of a NACK 114 and therefore device 12 does not retransmit the TA command to UA 10. Because the TA command is not received, TA timer 98 times out or expires at 116 and uplink synchronization is lost. Here, access device 12 does not recognize that uplink synchronization has been lost and in fact still operates as if the resource allocation to UA 10 is still valid. UA 10 recognizes that synchronization has been lost when the TA timer expires.

According to at least some embodiments of the disclosure, when the UA's timer expires and uplink synchronization is lost while data exists in the uplink buffer, UA 10 is programmed to store the uplink control channel resource configuration assigned by the access device, release the resource and immediately trigger an uplink scheduling transmission (e.g., a BSR) to indicate to access device 12 to re-establish uplink synchronization and report the amount of data to transmit. To this end, the UA starts a random access process and transmits the uplink scheduling transmission in response to the RA response from the access device 12. UA 10 includes the cell radio network terminal identifier (C-RNTI) currently assigned to the UA by the access device in the uplink scheduling transmission. When access device 12 receives the uplink scheduling transmission, access device 12 identifies the C-RNTI and is programmed to recognize that if the UA associated with the C-RNTI currently has an SR resource allocation. Where the UA currently has an SR resource allocation and used the RACH instead of the SR resource allocation, the access device 12 recognizes that the UA had and has lost uplink synchronization. Access device 12 determines if the uplink control channel resources allocated to the UA associated with the C-RNTI are still valid and if so, transmits uplink grant to UA 10 with an indication that the allocation is still valid and should be used by UA 10 to transmit the other data, for example, sounding reference signals, scheduling requests, channel quality status information including Channel Quality Indicator (CQI), Rank Indication (RI) and pre-coding matrix indicator (PMI), and ACK/NACK feedback in case of semi-persistent scheduling. The UA then uses stored uplink resource configuration to identify the previously released resources and starts to use those resources for future communications.

Figure 3:
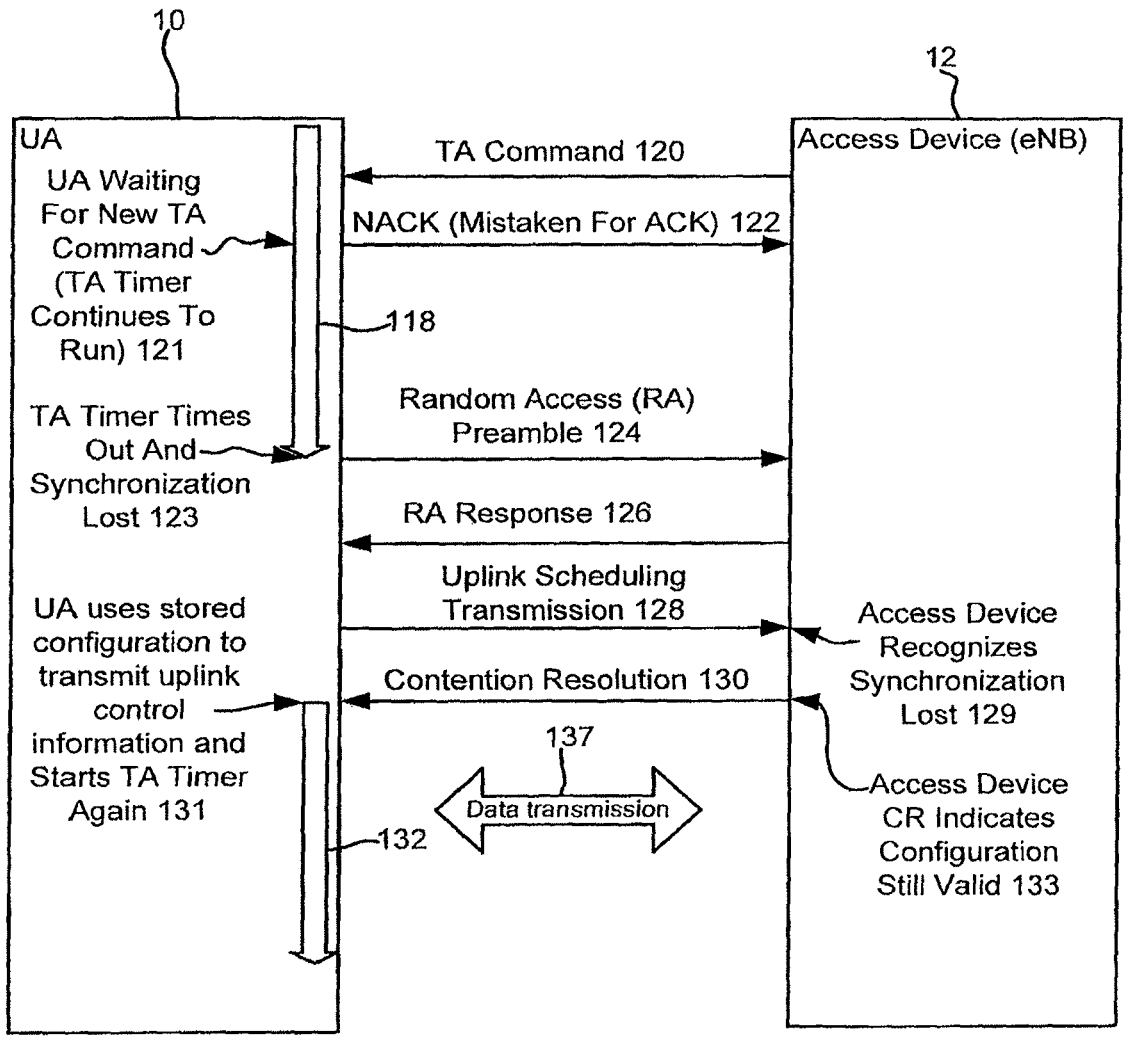
FIG. 3 is similar to FIG. 2, albeit illustrating a different communication sequence where a UA automatically triggers a regular BSR whenever uplink synchronization is lost while data is in the UA's uplink buffer.

Consistent with the above comments, referring to FIG. 3, a series of communications similar to the series illustrated in FIG. 2 is shown. In FIG. 3, as in FIG. 2, downward directed arrows 118 and 132 represent TA timer periods. Here, it is assumed that UA 10 is already associated with a Cell Radio Network Terminal ID (C-RNTI) that identifies the UA uniquely within a cell as in the previous example.

In FIG. 3, at 120, a TA command is transmitted to UA 10 which is incorrectly received. At 121, UA 10 transmits a NACK 122 back to access device 12 to indicate that the TA command should be retransmitted. NACK 122 is erroneously detected as an ACK and therefore access device 12 does not retransmit the TA command to UA 10. At 123 the TA timer period 118 expires.

When the timer expires, UA 10 stores the configuration of uplink control channel resources assigned by the access device before releasing the resources. Then UA 10 starts a random access process by transmitting an RA preamble to access device 12 via the RACH. In response to the RA preamble, access device 12 transmits an RA response 126 to UA 10 where the response includes an RA preamble identifier for the RA preamble, Timing advance (TA) information by which to adjust UpLink (UL) timing synchronization, grant information indicating UL resources allocated for transmitting subsequent messages, and a temporary C-RNTI that is used as a temporary UA ID during the random access procedure.

After receiving the RA response message, UA 10 checks the RA preamble identifier and if the checked RA preamble identifier is that of the transmitted RA preamble, the UA transmits an uplink scheduling transmission 128 (e.g. a BSR) using the uplink resources where the message includes the currently assigned C-RNTI (as opposed to the temporary C-RNTI that was included in RA response 126).

At 129, access device 12 identifies that message 128 which was to include the C-RNTI in fact includes the currently assigned C-RNTI and determines if SR resources are currently allocated to UA 10. Where SR resources are currently allocated to UA 10, access device 12 is programmed to conclude that uplink synchronization with UA 10 has been lost (i.e., an uplink resource for scheduling requests had been assigned to UA 10 and if UA 10 had maintained uplink synchronization, UA 10 would have used the scheduling request resource rather than random access procedure). At 133, access device 12 transmits a contention resolution (CR) message 130 to UA 10 which, among other data, includes an indication that the resource allocation for UA 10 is still valid. At 131, UA 10 accesses the stored configuration of the previously released resources and uses the configuration to transmit uplink control information to access device 12 for the subsequent data transmission 137.

Figure 4:
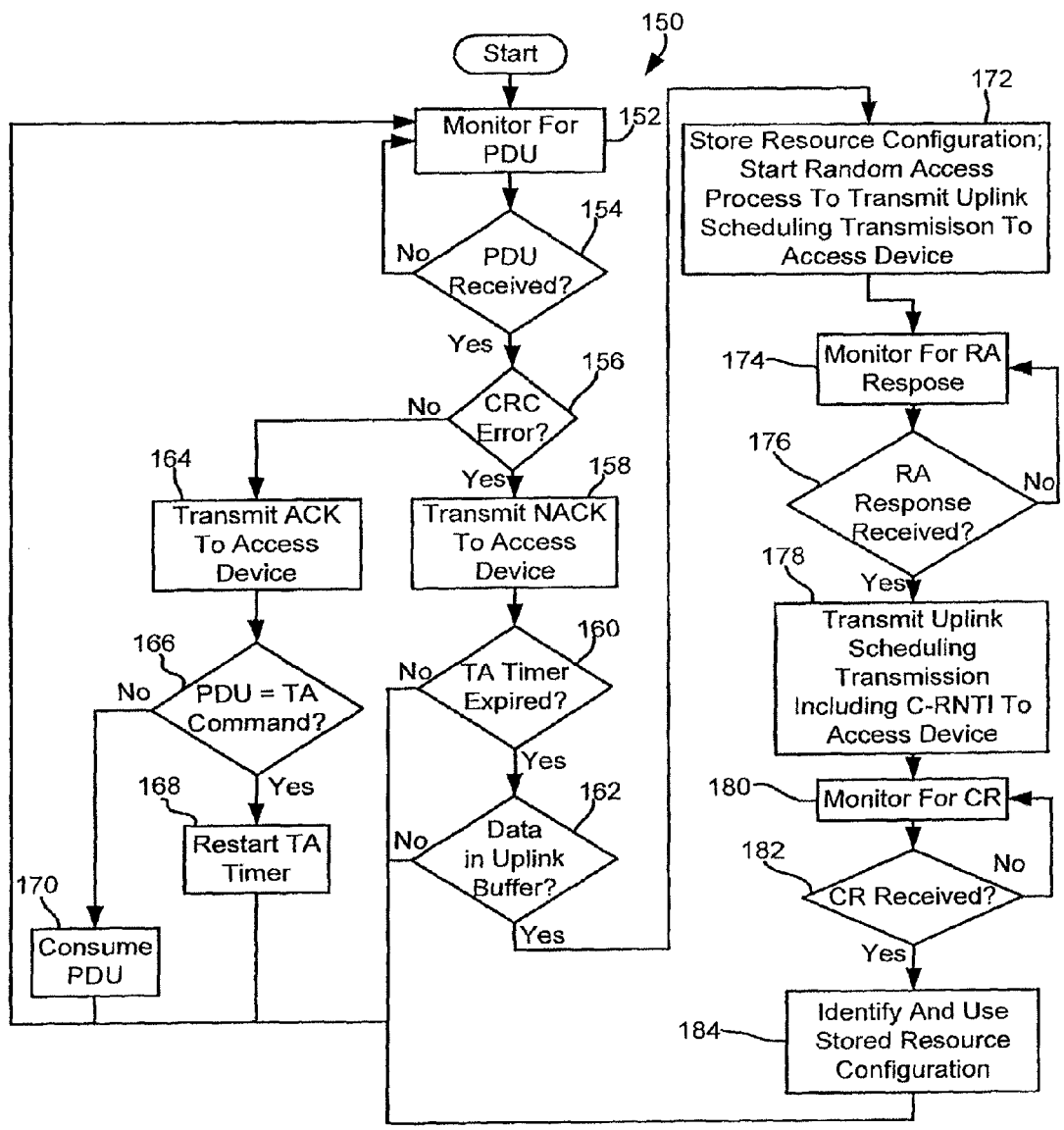
FIG. 4 is a flow chart illustrating a method or process performed by the UA of FIG. 1 to resynchronize uplink with an access device after a TA timer has expired when data still exists in the UA's uplink buffer.

Referring now to FIG. 4, a process 150 that is performed by UA 10 for automatically triggering a BSR when uplink synchronization is lost while data remains in the UA's uplink buffer is illustrated. Also referring to FIG. 5, a process 190 that is performed by access device 12 for re-synchronizing with UA 10 is illustrated. Hereafter processes 150 and 190 are described together. Referring also to FIG. 1, at block 192 in FIG. 5, access device 12 transmits a PDU to UA 10 that includes a TA command. At block 194, access device 12 monitors for either an ACK or a NACK in response to the transmitted PDU.

In FIG. 4, at block 152, UA 10 monitors for a PDU transmitted from access device 12. At block 154, when a PDU is received, control passes to block 156 where UA 10 determines whether or not the PDU was correctly received. Where the PDU is correctly received, control passes to block 164 where UA 10 transmits an ACK to access device 12. Next, at decision block 166, UA 10 determines whether or not the PDU includes a TA command. Where the PDU does not include a TA command, control passes to block 170 where the PDU is consumed after which control passes back up to block 152 where monitoring for a next received PDU occurs. Referring again to block 166, where the received PDU includes a TA command, control passes to block 168 where UA 10 applies the TA value in the TA command and restarts the TA timer after which control passes back up to block 152.

Referring again to FIGS. 1 and 4, where the PDU was not correctly received at block 156, control passes to process block 158 where UA 10 transmits NACK to access device 12. At block 160, UA 10 determines whether or not the TA timer period has expired. Where the TA timer has not expired, control passes back up to block 152 where monitoring for a next PDU occurs. At block 160, where the TA timer has expired, control passes to block 162 where UA 10 determines whether or not data exists in the UA's uplink buffer. Where no data exists in the UA's uplink buffer at block 162 control passes back up block 152. Where data does exist in the UA's uplink buffer, control passes from block 162 up to block 172. At block 172, UA 10 stores the configuration of the uplink control channel resource assigned by the access device, releases the resources and starts a random access process to transmit an uplink schedule transmission, e.g. BSR to access device 12. To this end and consistent with the comments above, the random access process is started when UA 10 transmits a RA preamble to access device 12. At block 174, UA 10 monitors for an RA response from the access device 12.

Referring again to FIGS. 1 and 5, at decision block 196, access device 12 determines if a ACK has been received. Where no ACK has been received, control passes to decision block 208 where access device 12 determines whether or not a NACK has been received. Where no NACK has been received control passes from block 208 back up to block 194 where access device 12 continues to monitor for an ACK or a NACK. At block 208, where a NACK has been received, control passes to block 210 where access device 12 retransmits the PDU including the TA command to UA 10.

Figure 5:
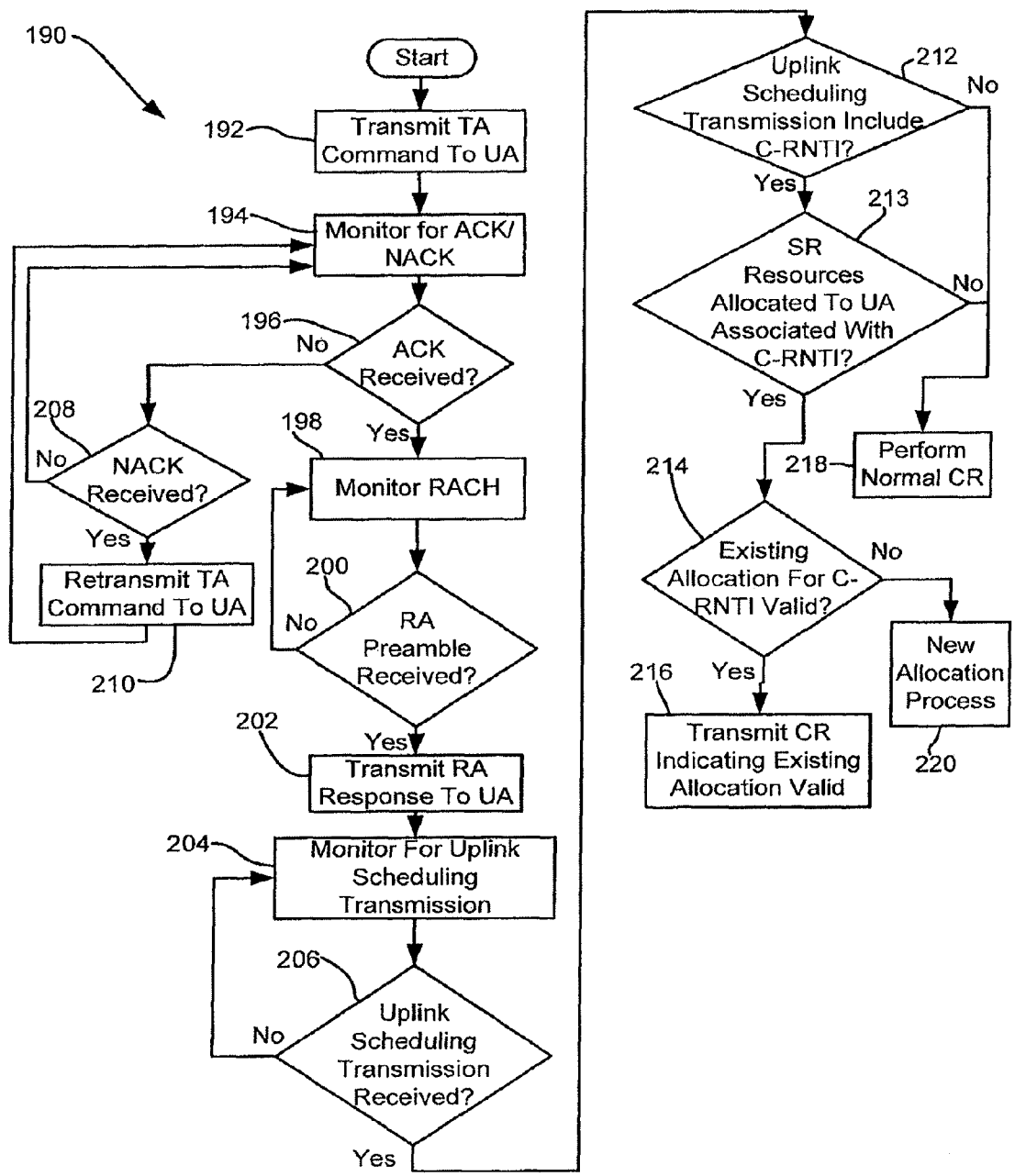
FIG. 5 is a flow chart illustrating a method or process performed by the access device of FIG. 1 to resynchronize when uplink communication with a UA has been lost.

Referring still to FIGS. 1 and 5, at block 196, where an ACK is received, control passes to process block 198 where access device 12 monitors the RACH to determine whether or not a random access process has commenced. At decision block 200, where an RA preamble has been received, control passes to block 202 where access device 12 transmits an RA response to UA 10 including the RA preamble identifier, timing alignment information for adjusting the uplink timing synchronization, grant information indicating uplink resources allocated for transmitting subsequent messages and the temporary C-RNTI. At block 204, after the RA response has been transmitted, access device 12 monitors for an uplink scheduling transmission from UA 10 using the allocated resources.

Referring again to FIGS. 1 and 4, at block 176, once an RA response has been received, control passes to block 178 where UA 10 uses the resources allocated in the RA response to transmit a scheduled transmission including the first or initial C-RNTI to access device 12. At block 180, UA 10 monitors for a contention resolution message from access device 12.

Referring once again to FIGS. 1 and 5, at block 206, when the uplink scheduling transmission is received from UA 10, at block 112 access device 12 determines whether or not the uplink scheduling transmission includes a C-RNTI. Where the uplink scheduling transmission does not include a C-RNTI, control passes to block 218 where access device 12 performs a normal contention resolution process. However, at block 212, where the uplink scheduling transmission does include a C-RNTI, control passes to block 213. At block 213, UA 10 determines if SR resources have already been allocated to the UA associated with the received C-RNTI. Where no SR resources have been allocated control passes to block 218 where a normal contention resolution processes proceeds. Where SR resources have already been allocated to the UA, access device 12 recognizes that uplink synchronization with the UA has been lost and control passes to block 214. At block 214, access device 12 identifies the existing resource allocation for the UA associated with the C-RNTI included in the uplink scheduling transmission and determines whether or not that allocation (e.g. resources for transmission of uplink control information) remains valid. Where the allocation does not remain valid, control passes to block 220 where a new resource allocation process is performed. At block 214, where the existing resource allocation remains valid, control passes to block 216 where access device 12 transmits a contention resolution message indicating that the existing allocation is valid.

Referring once more to FIGS. 1 and 4, when the contention resolution message is received at block 182, control passes to process block 184 where UA 10 identifies that the previously released resources are valid, accesses the stored resource configuration and starts to use the resource configuration. After block 184 control passes back up to block 152 where monitoring for a next PDU occurs.

Figure 6:
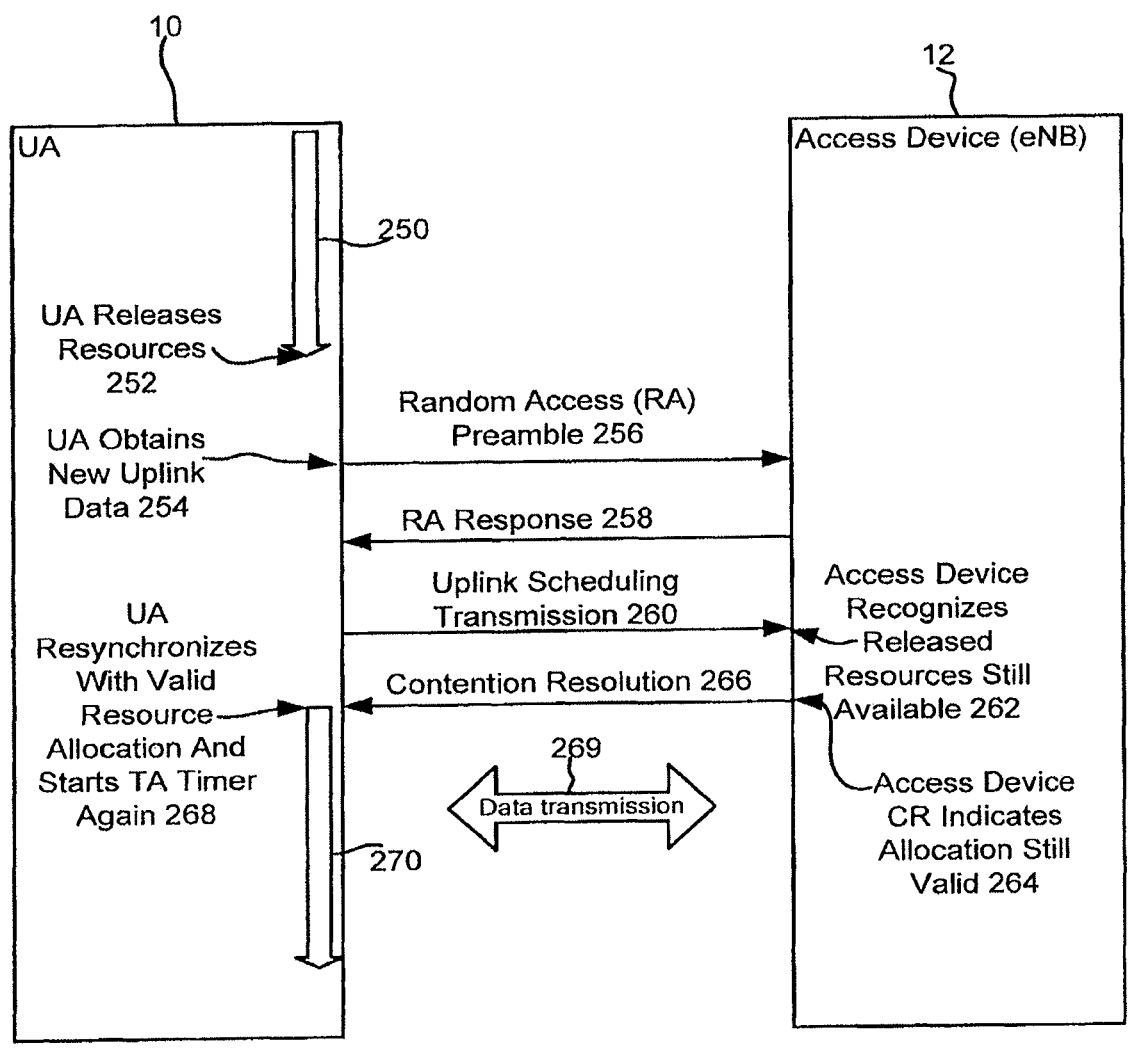
FIG. 6 is similar to FIG. 2, albeit illustrating a different communication sequence.

In cases where a UA obtains new uplink data after an access device stops transmitting TA commands to a UA so the UA releases control channel resources, when the UA starts a random access process, if the released resources are still valid and available for use by the UA, a process similar to that described above with respect to FIGS. 4 and 5 may be performed to restart communication efficiently. To this end, referring to FIG. 6, a series of communications similar to the series illustrated in FIG. 2 is shown. In FIG. 6, as in FIG. 2, downward directed arrows 250 and 270 represent TA timer periods. Here, it is assumed that UA 10 is already associated with a C-RNTI that identifies the UA uniquely in a cell.

In FIG. 6, at 252 the TA timer period expires and UA 10 releases the control channel resources. At 254 new uplink data arrives at UA 10 and UA 10 starts a random access process by transmitting an RA preamble to access device 12. In response to the RA preamble access device 12 transmits an RA response 258 including a temporary C-RNTI to UA 10. In response, UA 10 transmits an uplink scheduling transmission 260 including the C-RNTI currently assigned to UA 10 to access device 12. At 262, access device 12 identifies that uplink scheduling transmission 260 includes the currently assigned C-RNTI and is programmed to conclude that, therefore, UA 10 is the UA attempting to start new uplink transmission. The access device checks if the uplink control channel resources previously assigned to UA 10 are available. At 264, if the previously assigned resources are available, access device 12 transmits a contention resolution (CR) message 266 to UA 10 which, among other data, includes an indication that the resource allocation for UA is still valid. At 268, UA 10 starts to use the stored uplink resource configuration to transmit uplink control information to access device 12 for subsequent data transmission 269.

Figure 7:
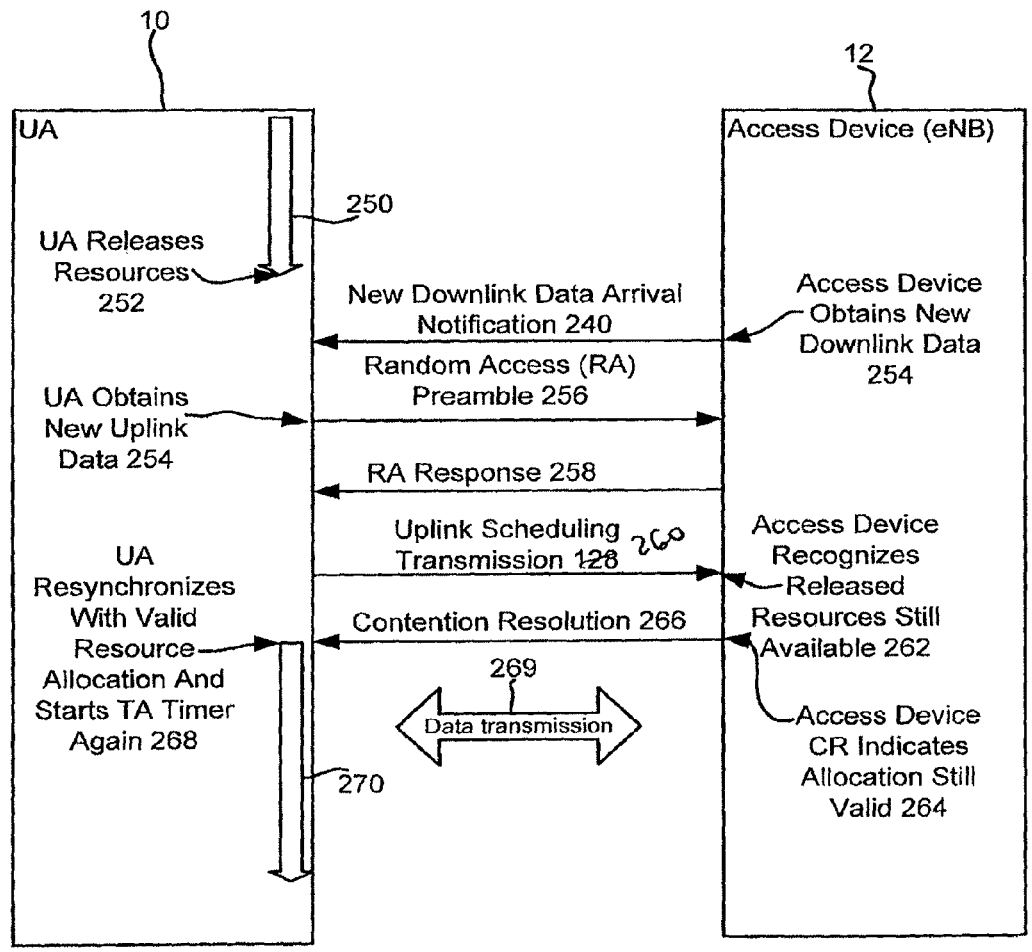
FIG. 7 is similar to FIG. 2, albeit illustrating a different communication sequence.

In cases where new downlink data is received by access device 12 after an access device stops transmitting TA commands to a UA so the UA releases control channel resources, if the released resources are still valid and available for use by the UA, a process similar to that described above with respect to FIG. 6 may be performed to establish communication. To this end, referring to FIG. 7, a series of communications similar to the series illustrated in FIG. 6 is shown. In FIG. 7, as in FIG. 2, downward directed arrows 250 and 270 represent TA timer periods. Here, it is assumed that UA 10 is already associated with a C-RNTI that identifies the UA uniquely in a cell.

In FIG. 7, at 252 the TA timer period expires and UA 10 stores the configuration of uplink control channel resources and releases the resources. At 254, new downlink data arrives at access device 12 and access device 12 commences the series of communications by transmitting a new downlink data arrival notification 240 to UA 10. In response to the RA preamble access device 12 transmits an RA response 258 including a temporary C-RNTI to UA 10. In response, UA 10 transmits an uplink scheduling transmission 260 including the C-RNTI currently assigned to UA 10 to access device 12. At 262, access device 12 identifies that uplink scheduling transmission 260 includes the currently assigned C-RNTI and is programmed to conclude that, therefore, UA 10 is the UA attempting to respond to the downlink data arrival notification. The access device checks if the uplink control channel resources previously assigned to UA 10 are available. At 264, if the previously assigned resources are available, access device 12 transmits a contention resolution (CR) message 266 to UA 10 which, among other data, includes an indication that the resource allocation for UA is still valid. At 268, UA 10 starts to use the stored uplink resource configuration to transmit uplink control information to access device 12 for subsequent data transmission 269 as indicated by TA timer period 270.

Here it should be appreciated that because access device 12 starts the series of communications in FIG. 7, access device 12 knows the identity of the UA that will start the random access procedure. For this reason, in at least some embodiments, instead of transmitting the valid allocation indication as part of the contention resolution message, access device 12 can send a dedicated preamble as part of notification 240 (i.e., a preamble specifically addressing UA 10) that indicates that the allocation is valid. In this case, the process could stop at 256 and proceed to 268 in FIG. 7. Consistent with these concepts, referring again to FIG. 7, at 252 the TA timer period expires and UA 10 releases the control channel resources. At 240, new downlink data arrives at access device 12 and access device 12 determines that the uplink resource previously assigned to the UA 10 to receive the new downlink data are still valid and available. If the resources are available, access device 12 commences a series of communications by transmitting a new downlink data arrival notification 240 to UA 10 that includes a dedicated preamble specifically identifying UA 10 and that indicates that the uplink resources are available and valid. When the dedicated preamble is received, UA 10 accesses the stored resource configuration and uses those resources to commence communication with the access device and the process in FIG. 7 can be cut short at communication 256.

Figure 8:
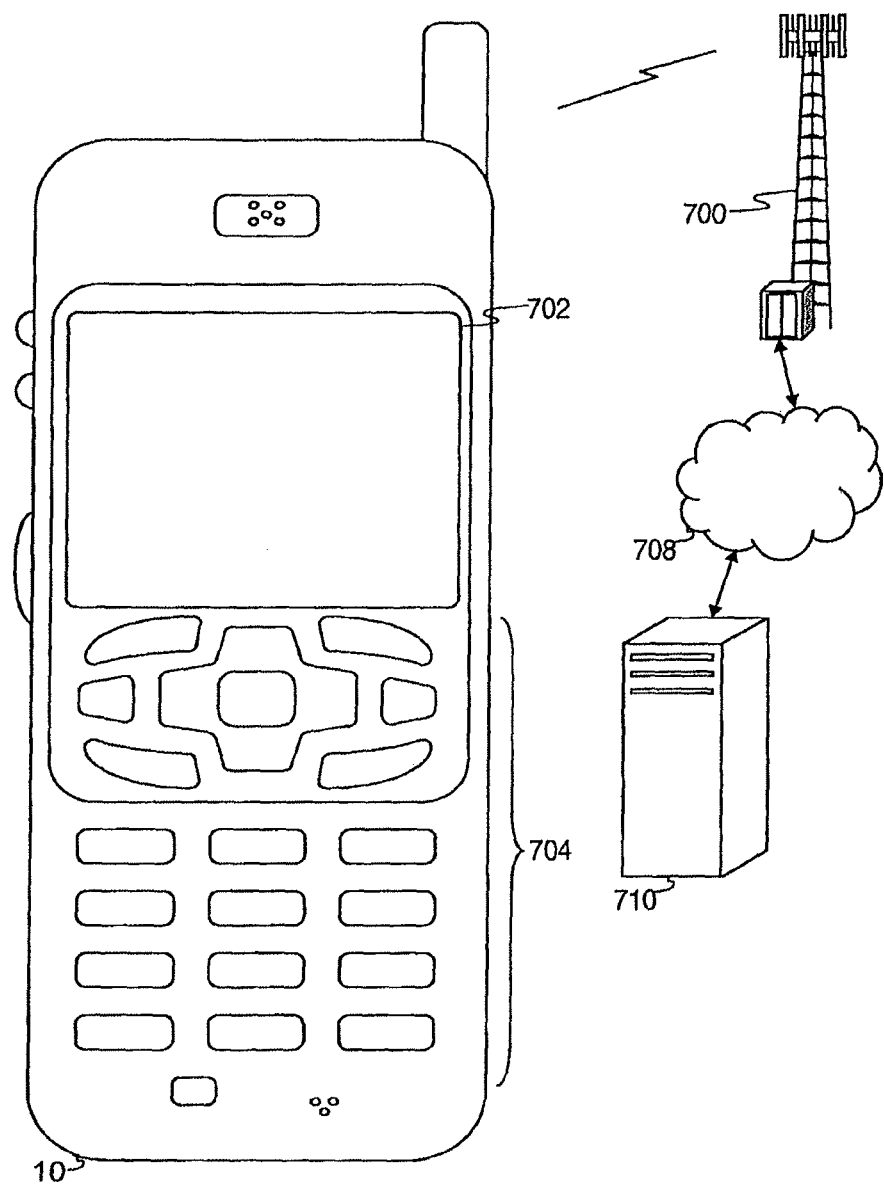
FIG. 8 is a diagram of a wireless communication system including a user agent operable for some of the various embodiments of the disclosure.

FIG. 8 illustrates a wireless communications system including an exemplary embodiment of UA 10. The UA 10 is operable for implementing aspects of the disclosure, but the disclosure should not be limited to these implementations. Though illustrated as a mobile phone, the UA 10 may take various forms including a wireless handset, a pager, a personal digital assistant (PDA), a portable computer, a tablet computer, a laptop computer. Many suitable devices combine some or all of these functions. In some embodiments of the disclosure, the UA 10 is not a general purpose computing device like a portable, laptop or tablet computer, but rather is a special-purpose communications device such as a mobile phone, a wireless handset, a pager, a PDA, or a telecommunications device installed in a vehicle. The UA 10 may also be a device, include a device, or be included in a device that has similar capabilities but that is not transportable, such as a desktop computer, a set-top box, or a network node. The UA 10 may support specialized activities such as gaming, inventory control, job control, and/or task management functions, and so on.

The UA 10 includes a display 702. The UA 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 10 may present options for the user to select, controls for the user to actuate, and/or cursors or other indicators for the user to direct.

The UA 10 may further accept data entry from the user, including numbers to dial or various parameter values for configuring the operation of the UA 10. The UA 10 may further execute one or more software or firmware applications in response to user commands. These applications may configure the UA 10 to perform various customized functions in response to user interaction. Additionally, the UA 10 may be programmed and/or configured over-the-air, for example from a wireless base station, a wireless access point, or a peer UA 10.

Among the various applications executable by the UA 10 are a web browser, which enables the display 702 to show a web page. The web page may be obtained via wireless communications with a wireless network access node, a cell tower, a peer UA 10, or any other wireless communication network or system 700. The network 700 is coupled to a wired network 708, such as the Internet. Via the wireless link and the wired network, the UA 10 has access to information on various servers, such as a server 710. The server 710 may provide content that may be shown on the display 702. Alternately, the UA 10 may access the network 700 through a peer UA 10 acting as an intermediary, in a relay type or hop type of connection.

Figure 9:
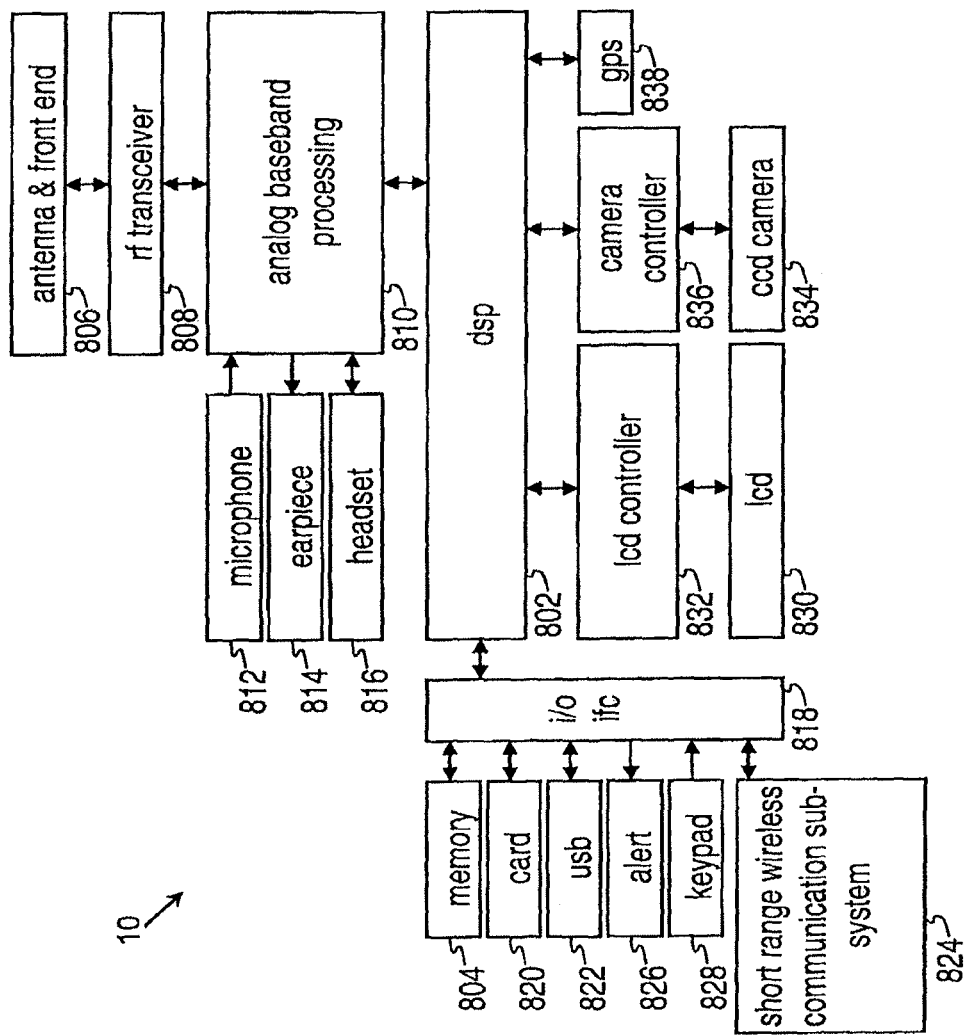
FIG. 9 is block diagram of a user agent operable for the some of the various embodiments of the disclosure.

FIG. 9 shows a block diagram of the UA 10. While a variety of known components of UAs 110 are depicted, in an embodiment a subset of the listed components and/or additional components not listed may be included in the UA 10. The UA 10 includes a digital signal processor (DSP) 802 and a memory 804. As shown, the UA 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UA 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UA 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UA 10 to send and receive information from a cellular network or some other available wireless communications network or from a peer UA 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog baseband processing unit 810 may be combined in one or more processing units and/or application specific integrated circuits (ASICs).

The analog baseband processing unit 810 may provide various analog processing of inputs and outputs, for example analog processing of inputs from the microphone 812 and the headset 816 and outputs to the earpiece 814 and the headset 816. To that end, the analog baseband processing unit 810 may have ports for connecting to the built-in microphone 812 and the earpiece speaker 814 that enable the UA 10 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UA 10 and may also enable the UA 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UA 10 to communicate wirelessly with other nearby mobile devices and/or wireless base stations.

The input/output interface 818 may further connect the DSP 802 to the alert 826 that, when triggered, causes the UA 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UA 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UA 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UA 10 to determine its position. Various other peripherals may also be included to provide additional functions, e.g., radio and television reception.

Figure 10:
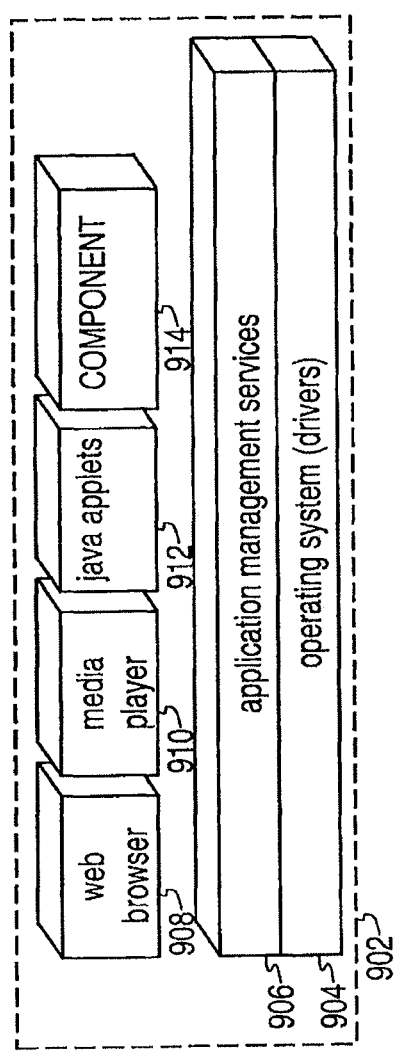
FIG. 10 is diagram of a software environment that may be implemented on a user agent operable for some of the various embodiments of the disclosure.

FIG. 10 illustrates a software environment 902 that may be implemented by the DSP 802. The DSP 802 executes operating system drivers 904 that provide a platform from which the rest of the software operates. The operating system drivers 904 provide drivers for the UA hardware with standardized interfaces that are accessible to application software. The operating system drivers 904 include application management services ("AMS") 906 that transfer control between applications running on the UA 10. Also shown in FIG. 10 are a web browser application 908, a media player application 910, and Java applets 912. The web browser application 908 configures the UA 10 to operate as a web browser, allowing a user to enter information into forms and select links to retrieve and view web pages. The media player application 910 configures the UA 10 to retrieve and play audio or audio-visual media. The Java applets 912 configure the UA 10 to provide games, utilities, and other functionality. A component 914 might provide functionality described herein.

Figure 11:
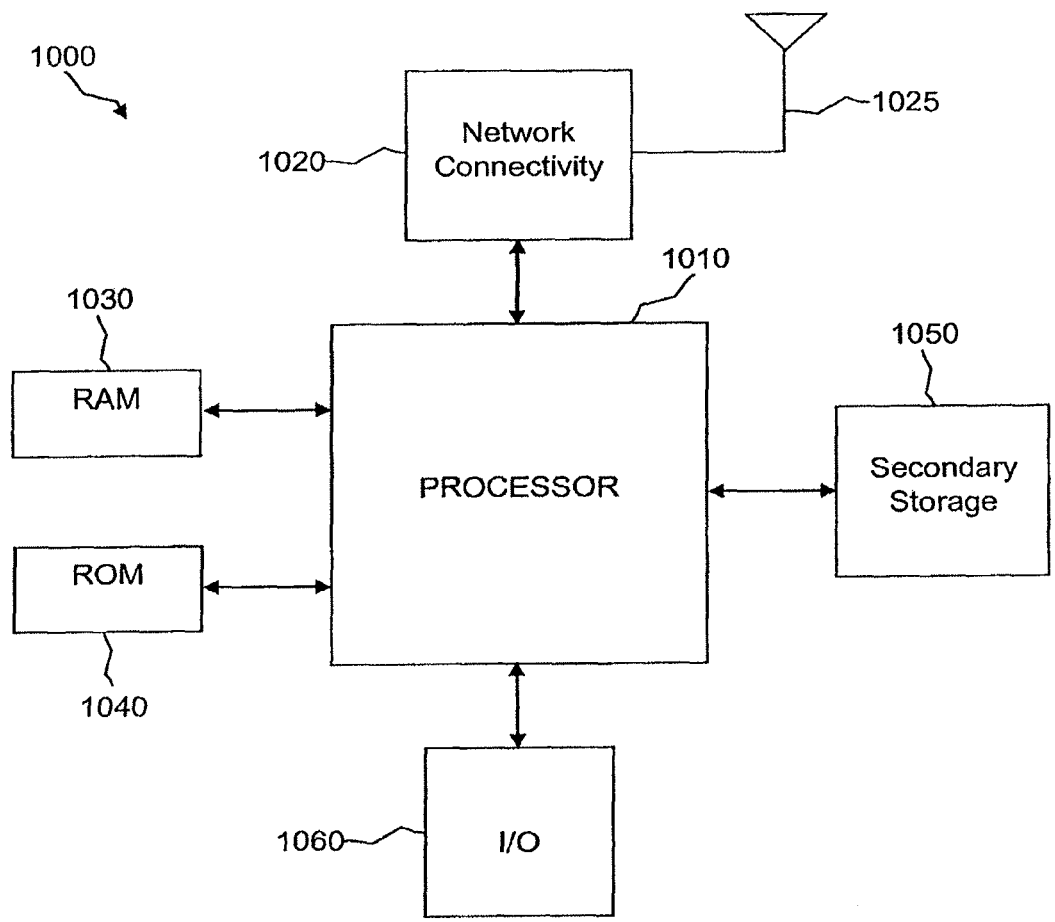
FIG. 11 is an illustrative general purpose computer system suitable for some of the various embodiments of the disclosure.

The UA 10, access device 120, and other components described above might include a processing component that is capable of executing instructions related to the actions described above. FIG. 11 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some embodiments, a program for implementing the determination of a minimum number of HARQ process IDs may be stored in ROM 1040. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UA 10, such as the display 702 and the input 704.

The following 3rd Generation Partnership Project (3GPP) Technical Specifications (TS) are incorporated herein by reference: TS 36.321, TS 36.331, and TS 36.300.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented. For instance, while the embodiments described above indicate that a UA stores an indication of uplink resources prior to release after a TA timer expires, in other embodiments the UA may not store the indication and when an access device recognizes that released resources are still valid, the access device may, in addition to sending an indication that the resources are valid, also send a resource grant re-granting the previously released resources.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

To apprise the public of the scope of this invention, the following claims are made:

What is claimed is:

1. A method comprising:
   operating, in a Long Term Evolution (LTE) mobile device, a time alignment timer to maintain uplink time alignment;
   receiving a configuration of a physical uplink control channel (PUCCH), wherein the configuration identifies a PUCCH resource;
   transmitting uplink transmissions using the PUCCH resource;
   after expiration of the time alignment timer, releasing PUCCH resources and maintaining the configuration of the PUCCH resource;
   subsequently re-synchronizing uplink time alignment; and
   after re-synchronizing uplink time alignment, determining whether the PUCCH resource is still available for further uplink transmissions.

2. The method of claim 1, further comprising:
   if the PUCCH resource is determined to still be available, transmitting further uplink transmissions using the PUCCH resource.

3. The method of claim 1, wherein re-synchronizing uplink time alignment includes performing a random access procedure.

4. The method of claim 3, further comprising:
   buffering uplink data while performing the random access procedure; and
   transmitting the uplink data in said further uplink transmissions after reestablishing uplink time alignment.

5. The method of claim 1, wherein the PUCCH resource is associated with ACK/NACK feedback.

6. The method of claim 1, wherein the PUCCH resource is to transmit ACK/NACK feedback.

7. The method of claim 1, wherein the time alignment timer is controlled by one or more time advance commands received from an access device.

8. The method of claim 1, wherein maintaining the configuration includes keeping the configuration in a memory.

9. The method of claim 1, wherein the PUCCH provides support for a hybrid automatic repeat request (HARQ) scheme in which ACK/NACK feedback is communicated to an access device using the PUCCH resource.

10. The method of claim 1, wherein said determining is based upon receiving an indication that the configuration is still available.

11. A Long Term Evolution (LTE) wireless device comprising:
    a processor;
    a transmitter linked to the processor; and
    a receiver linked to the processor,
    wherein the processor is programmed to:
       operate a time alignment timer to maintain uplink time alignment;
       receive a configuration of a physical uplink control channel (PUCCH) resource, wherein the configuration identifies an uplink resource;
       transmit uplink transmissions using the PUCCH resource;
       after expiration of the time alignment timer, release PUCCH resources and maintain the configuration of the PUCCH resource; and
       subsequently re-synchronize uplink time alignment; and
       after re-synchronizing uplink time alignment, determine whether the PUCCH resource is still available for further uplink transmissions.

12. The LTE wireless device of claim 11 wherein the processor is further programmed to;
    if the PUCCH resource is determined to still be available, transmit said further uplink transmissions using the PUCCH resource.

13. The LTE wireless device of claim 11 wherein the processor is further programmed to, during the re-synchronization of uplink time alignment, perform a random access procedure.

14. The LTE wireless device of claim 11 further including a memory linked to the processor wherein the processor maintains the configuration by storing the configuration in the memory.

15. A non-transitory computer-readable medium comprising software, which, when executed by a processor, causes the processor to:
    operating, in a Long Term Evolution (LTE) mobile device, a time alignment timer to maintain uplink time alignment;
    receive a configuration of a physical uplink control channel (PUCCH) resource, wherein the configuration identifies an uplink resource;
    transmit uplink transmissions using the PUCCH resource;
    after expiration of the time alignment timer, release PUCCH resources and maintain the configuration of the PUCCH resource notwithstanding expiration of the time alignment timer; and
    subsequently re-synchronize uplink time alignment; and
    after re-synchronizing uplink time alignment, determine whether the PUCCH resource is available for further uplink transmissions.

16. A method comprising:
    allocating a Physical Uplink Control Channel (PUCCH) resource to a wireless device;
    sending a PUCCH resource configuration to the wireless device;
    transmitting one or more time advance commands to the wireless device to control a time alignment timer in the wireless device;
    receiving uplink transmissions from the wireless device over the PUCCH resource;
    receiving an uplink transmission request after the time alignment timer has expired; and
    sending an indication that the PUCCH resource configuration is still available.

17. The method of claim 16, further comprising:
    in response to receiving the uplink transmission request, sending an uplink grant to the wireless device to grant transmission using the previously allocated PUCCH resource.

18. The method of claim 16, wherein the indication that the PUCCH resource configuration is still available is included in a message to the wireless device.

19. The method of claim 18, wherein the indication that the PUCCH resource configuration is still available is included in a message from an access node.

* * * * *

UNITED STATES PATENT AND TRADEMARK OFFICE
CERTIFICATE OF CORRECTION

| | |
|---|---|
| PATENT NO. | : 8,441,970 B1 |
| APPLICATION NO. | : 13/743557 |
| DATED | : May 14, 2013 |
| INVENTOR(S) | : Suzuki et al. |

It is certified that error appears in the above-identified patent and that said Letters Patent is hereby corrected as shown below:

In the Claims

Claim 6, Col. 19, Line 35, before "to" insert --used--.

Signed and Sealed this
Twenty-second Day of October, 2013

Teresa Stanek Rea
*Deputy Director of the United States Patent and Trademark Office*